US012685887B2

(12) United States Patent
Lee et al.

(10) Patent No.: US 12,685,887 B2
(45) Date of Patent: Jul. 21, 2026

(54) FIRE EXTINGUISHING MICRO-CAPSULE, METHOD FOR MANUFACTURING SAME, AND FIRE EXTINGUISHER INCLUDING SAME

(71) Applicant: GFI CO., LTD., Gimpo-si (KR)

(72) Inventors: Sang Sup Lee, Seoul (KR); Alexandra Sertsova, Seoul (KR); Sergei Krasilnikov, Seoul (KR)

(73) Assignee: GFI CO., LTD., Gimpo-si (KR)

( * ) Notice: Subject to any disclaimer, the term of this patent is extended or adjusted under 35 U.S.C. 154(b) by 694 days.

(21) Appl. No.: 17/438,660

(22) PCT Filed: Feb. 19, 2020

(86) PCT No.: PCT/KR2020/002432
§ 371 (c)(1),
(2) Date: Sep. 13, 2021

(87) PCT Pub. No.: WO2020/189900
PCT Pub. Date: Sep. 24, 2020

(65) Prior Publication Data
US 2022/0152439 A1 May 19, 2022

(30) Foreign Application Priority Data

Mar. 19, 2019 (KR) ........................ 10-2019-0031519

(51) Int. Cl.
*B01J 13/18* (2006.01)
*A62D 1/00* (2006.01)
(52) U.S. Cl.
CPC ............ *A62D 1/0021* (2013.01); *B01J 13/18* (2013.01)
(58) Field of Classification Search
None
See application file for complete search history.

(56) References Cited

U.S. PATENT DOCUMENTS

| | | | | |
|---|---|---|---|---|
| 8,465,833 B2 * | 6/2013 | Lee | ........................ | C09D 5/185 |
| | | | | 428/323 |
| 9,968,813 B2 | 5/2018 | Bliznets et al. | | |
| 2005/0077054 A1 * | 4/2005 | Bennett | .................... | A62D 1/00 |
| | | | | 169/30 |
| 2013/0313466 A1 | 11/2013 | Bliznets et al. | | |
| 2014/0374641 A1 * | 12/2014 | Liu | ........................ | A62C 5/006 |
| | | | | 252/6 |
| 2019/0076687 A1 | 3/2019 | Vilesov et al. | | |

FOREIGN PATENT DOCUMENTS

| | | | | | |
|---|---|---|---|---|---|
| CN | 101664587 A | * | 3/2010 | | |
| CN | 106807027 A | * | 6/2017 | .......... | A62D 1/0021 |
| CN | 108905038 A | * | 11/2018 | .......... | A62D 1/0021 |
| EP | 3 228 366 A1 | | 10/2017 | | |
| JP | 2014-509230 A | | 4/2014 | | |
| JP | 2016-176013 A | | 10/2016 | | |
| KR | 10-1733423 B1 | | 5/2017 | | |
| WO | 2012/177181 A1 | | 12/2012 | | |

OTHER PUBLICATIONS

International Search Report of PCT/KR2020/002432 dated May 26, 2020 [PCT/ISA/210].

* cited by examiner

*Primary Examiner* — Tanisha Diggs
(74) *Attorney, Agent, or Firm* — Sughrue Mion, PLLC

(57) ABSTRACT

The present invention relates to a fire extinguishing micro-capsule, a method for manufacturing the same, and a fire extinguisher using the same. The fire extinguishing micro-capsule has a core-shell structure in which a core includes a liquid fire extinguishing agent and a shell uses a high-density non-porous polymer material. A decapsulation process of the fire extinguishing micro-capsule occurs in a narrow time and temperature range at a rate of at least 150%/min, and the stability of the agent in water and other solvents is significantly increased. A fire extinguisher including the fire extinguishing micro-capsule has increased lifetime and operational efficiency.

25 Claims, 1 Drawing Sheet

FIG. 1(a)
FIG. 1(b)
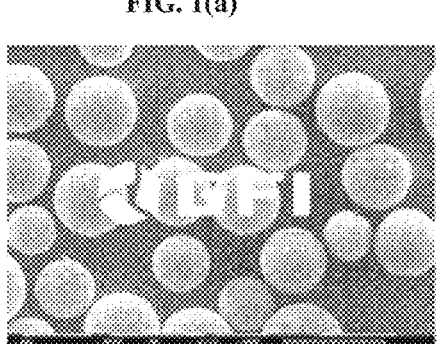
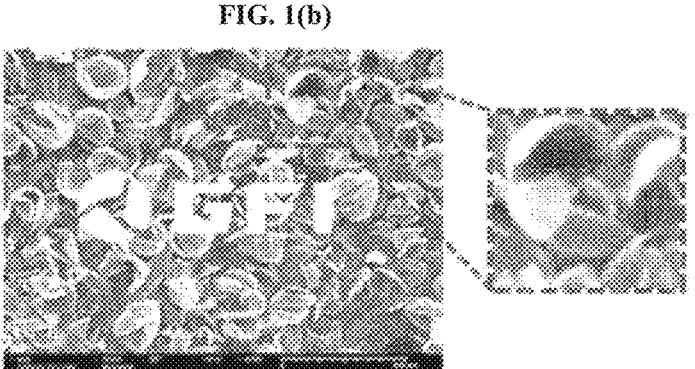
FIG. 2
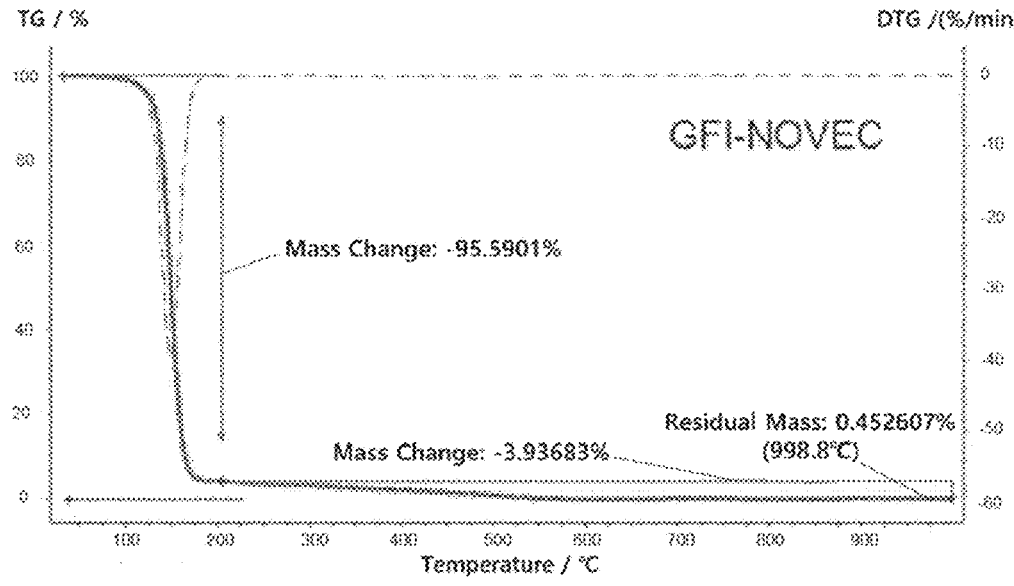

FIRE EXTINGUISHING MICRO-CAPSULE, METHOD FOR MANUFACTURING SAME, AND FIRE EXTINGUISHER INCLUDING SAME

CROSS REFERENCE TO RELATED APPLICATIONS

This application is a National Stage of International Application No. PCT/KR2020/002432 filed on Feb. 19, 2020, claiming priority based on Korean Patent Application No. 10-2019-0031519 filed on May 19, 2019.

TECHNICAL FIELD

The present invention relates to a fire extinguishing micro-capsule, a method for manufacturing the same, and a fire extinguisher including the same, and more particularly, to a capsule including a fire extinguishing agent, a method for manufacturing the same, and a fire extinguisher including a fire extinguishing micro-capsule and capable of extinguishing a fire in the event of fire.

BACKGROUND ART

Encapsulation is a physico-chemical process in which a core is a liquid, solid, or gas and a shell is formed to enclose the outside of the core. In a core-shell structure, the shell prevents the encapsulated core from interacting with the external environment.

Such an encapsulation process is widely used to extend the functions of various materials. The main purpose of the encapsulation is the controlled external release of the encapsulated core. In general, the encapsulated core needs complete separation from the outside in storage and processing steps.

The external release of the core upon encapsulation may vary depending on the intended use. For example, in order to use the controlled external release of the core from the shell, the core such as drugs, pesticides, fragrances, and mineral fertilizers may be encapsulated and used.

Among various uses of such encapsulation, various technologies are under development, in which a fire extinguishing agent is contained as a core, and in case of a fire, a shell is destroyed so that the fire extinguishing agent is released to the outside, thereby extinguishing a fire.

In the case of a fire extinguishing micro-capsule, a core is a fire extinguishing agent and is encapsulated inside a shell. When a fire occurs, decapsulation occurs so that the fire extinguishing agent is decapsulated from the shell in a short time within a narrow temperature range, thereby quickly extinguishing a fire and increasing fire extinguishment efficiency.

On the other hand, the functions required for the fire extinguishing micro-capsule having the core-shell structure are as follows: it must be able to separate the fire extinguishing agent (that is, the core) from the external environment, the stability must be increased by blocking the leakage of the fire extinguishing agent during storage, the properties thereof must be retained during a long-term storage above a boiling point, the moisture resistance of the fire extinguishing agent itself must be maintained, and the stability against exposure to other solvents must be ensured.

In the fire extinguishing micro-capsule, the volume of the fire extinguishing agent rapidly expands at a temperature (decapsulation temperature) above 70° C. (the boiling point of the fire extinguishing agent), and the shell is destroyed so that the fire extinguishing agent is released to the outside.

The rate of destruction of the shell must be greater than the rate of decomposition of the fire extinguishing agent in the flame during fire extinguishing. Otherwise, the concentration value of the fire extinguishing agent necessary for extinguishing the fire cannot be obtained. The release of the encapsulated fire extinguishing agent must proceed rapidly in order to achieve the fire extinguishing concentration value required for extinguishing the fire.

In order to manufacture the fire extinguishing micro-capsule with rapid release, correct materials and forming methods for the shell forming the capsule must be selected. The fire extinguishing micro-capsule must have a dense, non-porous, and single-layer or multi-layer structure based on proteins (gelatin, casein, etc.), polymers (thermosetting polymers and thermoplastics), cellulose derivatives (methyl, ethyl, acetyl, nitro, carboxymethyl cellulose), or inorganic materials (silicates, carbides, etc.).

As an example of the related art for manufacturing the fire extinguishing micro-capsule as described above, WO 2012/177181 discloses a micro-encapsulated fire extinguishing agent, a method for obtaining the same, a fire extinguishing composite material, and a fire extinguishing coating method.

The invention provides a method for micro-encapsulating a fire extinguishing agent in a shell, and a shell made of cross-linked gelatin filled with a compound of polyvinyl alcohol and urea-resorcinol-formaldehyde resin or a mineral film (exfoliated montmorillonite) having a thickness of 1 nm to 5 nm is described.

The polymer shell (outer wall) reacts in a temperature range of 90-270° C. As a result, the encapsulated fire extinguishing agent retains its properties during storage, and the weight loss of the capsule does not exceed 1.5% within 70-100 days.

On the other hand, a disadvantage of the invention is the low temperature decapsulation of the fire extinguishing agent. A fire extinguishing agent Novec 1310 has a boiling point of 90° C. and a fire extinguishing agent Novec 114 has a boiling point of 120° C., decapsulation occurring at a low temperature adversely affects the physical properties of the fire extinguishing micro-capsule.

In addition, the step-by-step decapsulation of the capsule, which can be inferred from thermo-gravimetric analysis data in the invention, has a limitation that does not exhibit a rapid fire extinguishing effect because the fire extinguishing agent does not diffuse in a short time within a narrow temperature range.

Therefore, there is an urgent need for research on a fire extinguishing micro-capsules that exhibits long-term storage and safety at room temperature and above a boiling point and can quickly release a fire extinguishing agent in a short time within a narrow temperature range during a decapsulation process of the fire extinguishing agent.

CITATION LIST (Patent Literature 1) WO 2012/177181 (2012. 12. 27.)

DESCRIPTION OF EMBODIMENTS

Technical Problem

The present invention has been made in an effort to solve the above problems, and an object of the present invention is to provide a fire extinguishing micro-capsule, a method for manufacturing the same, and a fire extinguisher using the same, wherein the fire extinguishing micro-capsule exhibits long-term storage and safety at room temperature and above a boiling point, has improved dynamics (reaction rate, dynamic properties) so that the release of the fire extinguishing agent can occur quickly in a short time within a narrow temperature range in a decapsulation process of the fire extinguishing agent, has a shell thickness of 200 nm to 5 μm, and is resistant to the effects of water and other solvents (alcohols, ketones, esters, etc.).

Solution to Problem

In order to achieve the above-described object, the present invention provides a fire extinguishing micro-capsule having a core-shell structure, in which the core is a fire extinguishing agent and the shell is a high-density non-porous polymer, and including a precipitant and/or a coagulant.

In addition, the fire extinguishing agent is the formula $C_xH_yO_zHal_k$ (where x, y, z, and k are 0, 1, 2, . . . , and Hal is Br, I, and F).

In addition, the shell is made of one or more resins selected from the group consisting of cross-linked polyvinyl acetate, ethyl vinyl acetate, polyvinyl alcohol, polyurea, polyurethane, polyester resin, epoxy resin, urea formaldehyde resin, melamine formaldehyde resin, phenol formaldehyde resin, and resorcinol formaldehyde resin.

In addition, the precipitant includes one or more precipitants selected from the group consisting of potassium acetate, sodium citrate, sodium chloride, ammonium chloride, sodium iodide, potassium iodide, copper sulfate, and sodium thiocyanate.

In addition, the coagulant includes one or more coagulants selected from the group consisting of aluminum sulfate, zinc hydroxide, iron hydroxide, and iron chloride.

In addition, a decapsulation process in which the fire extinguishing agent releases the shell occurs in a short time within a narrow temperature range, and a decapsulation rate exceeds 150%/min.

In addition, a temperature range in which the weight of the fire extinguishing micro-capsule is reduced from 95% to 15% (the fire extinguishing agent is released to the outside) is within 40° C.

In addition, a thickness of the shell is in a range of 200 nm to 5 μm.

In addition, when the fire extinguishing micro-capsule is left at 30° C. for 30 days, a weight loss is 0.5% or less of an initial weight.

In addition, when the fire extinguishing micro-capsule is left at 60° C. for 30 days, a weight loss is 1% or less of an initial weight.

In addition, the shell maintain physico-mechanical properties when exposed to water, alcohol, ketone, ether, and mixtures thereof, and a weight loss after drying is 0.5% or less of an initial weight.

In addition, the present invention provides a method for manufacturing a fire extinguishing micro-capsule, the method including: (a) preparing a first colloidal solution in which a dispersion phase is a fire extinguishing agent that is a core, and a dispersion solvent is polar or non-polar; (b) preparing a second colloidal solution in which a dispersion phase is a prepolymer or oligomer that is a shell, and a dispersion solvent is polar or non-polar; (c) mixing the first colloidal solution and the second colloidal solution prepared in steps (a) and (b) with a precipitant and/or a coagulant; (d) forming a fire extinguishing micro-capsule by precipitating and curing the second colloidal solution at an interface of the first colloidal solution mixed in step (c) to form a core-shell; and (e) washing and filtering the fire extinguishing micro-capsule formed in step (d).

In addition, the fire extinguishing agent in step (a) is the formula $C_xH_yO_zHal_k$ (where x, y, z, and k are 0, 1, 2, . . . , and Hal is Br, I, and F).

In addition, the shell in step (b) is one or more resins selected from the group consisting of cross-linked polyvinyl acetate, ethyl vinyl acetate, polyvinyl alcohol, polyurea, polyurethane, polyester resin, epoxy resin, urea formaldehyde resin, melamine formaldehyde resin, phenol formaldehyde resin, and resorcinol formaldehyde resin.

In addition, in step (a), a nonionic material or an ionic surfactant is further included as a stabilizer or an emulsifier.

In addition, in step (a), a polymer material is further included as a stabilizer In addition, in step (a), one or more selected from the group consisting of water, ketones, alcohols or aliphatic hydrocarbons are further included as the dispersion phase.

In addition, the precipitant in step (c) includes one or more precipitants selected from the group consisting of potassium acetate, sodium citrate, sodium chloride, ammonium chloride, sodium iodide, potassium iodide, copper sulfate, and sodium thiocyanate.

In addition, the coagulant in step (c) includes one or more coagulants selected from the group consisting of aluminum sulfate, zinc hydroxide, iron hydroxide, and iron chloride.

In addition, in step (d), a shell curing accelerator or curing catalyst is further included.

In addition, in step (d), when the second colloidal solution is precipitated and cured at the interface of the first colloidal solution, ultraviolet rays, microwave, infrared rays, or induction heating is applied to cure the shell.

In addition, the present invention provides a fire extinguisher in which the above-described fire extinguishing micro-capsule is dispersed in a polymer matrix.

In addition, the polymer matrix is one or more resins selected from the group consisting of phenol formaldehyde resin, polyester resin, epoxy resin, urea resin, resorcinol formaldehyde resin, polyurethane, polyurea, polyacrylate, or polymethyl methacrylate.

In addition, the fire extinguisher includes 0.1-90 wt % of the fire extinguishing micro-capsule.

In addition, the fire extinguisher further includes a decapsulation agent, a decapsulation catalyst, a decapsulation temperature control agent, a diffusion accelerator, a gas permeability enhancer, and a heat conductivity enhancing component.

In addition, the fire extinguisher is in a flexible or solid form

In addition, a case including a gas-permeable membrane is formed on one surface of the fire extinguisher.

In addition, the case is made of one selected from the group consisting of glass fiber, carbon fiber, stainless steel, aluminum-enhanced phenol-formaldehyde, and epoxy.

In addition, the gas-permeable membrane has a cell size of 10-400 μm.

Advantageous Effects of Disclosure

A fire extinguishing micro-capsule according to the present invention includes a fire extinguishing agent encapsulated inside a shell in a core-shell structure, has high resistance to water or other solvents because the shell made of a polymer is strong, and exhibits long-term storage and safety at room temperature and above a boiling point. Therefore, the operational reliability thereof is improved, and decapsulation in which the fire extinguishing agent destroys the shell and is released occurs quickly in a short time within a narrow temperature range in a decapsulation process of the fire extinguishing agent. When a fire occurs and an ambient temperature rises above a predetermined temperature, the fire extinguishing agent is released in the early stage to extinguish the fire or prevent the fire from spreading.

In addition, the fire extinguishing micro-capsule according to the present invention, the shell is maintained at a high temperature to support the fire extinguishing agent above a boiling point. Therefore, ESS, lithium-ion battery module, etc., the temperature of which suddenly rises and falls rapidly, can maintain the performance without malfunction.

In addition, since the fire extinguishing micro-capsule according to the present invention exhibits high resistance to water or other solvents, a stable and reliable fire extinguisher can be manufactured because the leakage of the fire extinguishing agent, which is the core inside the shell, is reduced even when various fire extinguisher is manufactured by dispersing the fire extinguishing agent in a polymer matrix.

BRIEF DESCRIPTION OF DRAWINGS

FIG. 1(*a*) is a SEM image of a fire extinguishing micro-capsule and FIG. 1(*b*) is a fire extinguishing micro-capsule destroyed above a decapsulation temperature, according to an embodiment of the present invention.

FIG. 2 is a graph showing a thermo-gravimetric analyzer result of the fire extinguishing micro-capsule according to an embodiment of the present invention.

BEST MODE

Prior to detailed description through preferred embodiments of the present invention, the terms or words used in the present specification and the claims should not be construed as being limited to ordinary or dictionary meanings. The terms or words should be construed as meanings and concepts consistent with the technical idea of the present invention.

It will be understood that the terms "comprise," "include," or "have" as used herein specify the presence of stated elements, but do not preclude the presence or addition of one or more other elements.

Hereinafter, a fire extinguishing micro-capsule, a method for manufacturing the same, and a fire extinguisher using the same, according to the present invention, will be described in more detail.

The present invention provides a fire extinguishing micro-capsule having a core-shell structure, in which the core is a fire extinguishing agent and the shell is a high-density non-porous polymer, and including a precipitant and/or a coagulant.

FIG. 1(*a*) is an SEM photograph of a fire extinguishing microcapsule according to an embodiment of the present invention, wherein the fire extinguishing micro-capsule has a spherical shape and the size of the fire extinguishing micro-capsule may be 150-300 μm, but the present invention is limited thereto.

The fire extinguishing agent of the present invention may use the formula $C_xH_yO_zHal_k$ (where x, y, z, and k are 0, 1, 2, . . . , and Hal is Br, I, and F). For example, 3M's Novec 1230 may be used as the fire extinguishing agent.

The shell of the present invention may be made of one or more resins selected from the group consisting of cross-linked polyvinyl acetate, ethyl vinyl acetate, polyvinyl alcohol, polyurea, polyurethane, polyester resin, epoxy resin, urea formaldehyde resin, melamine formaldehyde resin, phenol formaldehyde resin, and resorcinol formaldehyde resin.

Alternatively, the shell may be made of copolymers of at least two selected from cross-linked polyvinyl acetate, ethyl vinyl acetate, and polyvinyl alcohol, or copolymers of at least two selected from polyurea, polyurethane, polyester resin, epoxy resin, urea formaldehyde resin, melamine formaldehyde resin, phenol formaldehyde resin, and resorcinol formaldehyde resin.

The precipitant of the present invention may include one or more precipitants selected from the group consisting of potassium acetate, sodium citrate, sodium chloride, ammonium chloride, sodium iodide, potassium iodide, copper sulfate, and sodium thiocyanate.

In addition, the coagulant may include one or more coagulants selected from the group consisting of aluminum sulfate, zinc hydroxide, iron hydroxide, and iron chloride.

In the fire extinguishing micro-capsule of the present invention, a decapsulation process in which the fire extinguishing agent, which is the core, releases the shell occurs in a short time within a narrow temperature range, and a decapsulation rate that is a rate at which the fire extinguishing agent releases the shell may exceed 150%/min.

FIG. 1(*b*) is a SEM photograph of the shell after the fire extinguishing agent, which is the core included inside the shell, is converted from liquid to gas due to the increase in ambient temperature, destroys the shell due to the increase in volume, and thus flows out.

As in FIG. 1(*b*), a process in which the core destroys the shell and comes out or the shell collapses to release the core is referred to as a decapsulation process, it is preferable that the temperature range it which the weight of the fire extinguishing micro-capsule drops from 95% to 15% (the fire extinguishing agent is released to the outside) in the decapsulation process is within 40° C.

FIG. 2 is a graph showing a thermo-gravimetric analyzer result of the fire extinguishing micro-capsule according to an embodiment of the present invention. Referring to FIG. 2, the temperature at which the weight of the fire extinguishing micro-capsule becomes 95% is 130° C., and the temperature at which the weight of the fire extinguishing micro-capsule becomes 15% is 170° C. When the temperature range at which the decapsulation process of the fire extinguishing agent occurs differs by more than 40° C., the fire extinguishing agent is released stepwise, which does not satisfy the appropriate concentration of the fire extinguishing agent for extinguish the fire. In order to quickly extinguish the fire, the fire extinguishing agent must be released at once within a narrow temperature range. Therefore, the fire extinguishing micro-capsule may be configured so that the weight of the fire extinguishing micro-capsule is 95% to 15% within a temperature range of 40° C.

In addition, a decapsulation rate in which a non-decapsulated fire extinguishing micro-capsule is a denominator and a decapsulated fire extinguishing micro-capsule is a numerator may exceed 150%/min.

The shell thickness of the fire extinguishing micro-capsule of the present invention may be in a range of 200 nm to 5 μm. When the shell thickness is less than 200 nm, the stability of the shell is lowered, and the fire extinguishing agent inside the shell may leak out to the outside, or the shape of the fire extinguishing micro-capsule may be damaged due to the weight of the shells. When the shell thickness is greater than 5 μm, the decapsulation process in which the fire extinguishing agent inside the shell is released to the outside hardly occurs.

In addition, in order for long-term storage and safety of the extinguishing agent at room temperature and above the boiling point, the shell may be formed so that, when the fire extinguishing micro-capsule is left at 30° C. for 30 days, the weight loss is 0.5% or less of the initial weight, and when the fire extinguishing micro-capsule is left at 60° C. for 30 days, the weight loss is 1% or less of the initial weight.

In the present invention, the shell of the fire extinguishing micro-capsule can be formed so that the shell maintains physico-mechanical properties when exposed to water, alcohol, ketone, ether, and mixtures thereof, which can be contacted in the external environment, and the weight loss after drying is 0.5% or less of the initial weight.

In addition, the present invention provides a method for manufacturing a fire extinguishing micro-capsule including: (a) preparing a first colloidal solution in which a dispersion phase is a fire extinguishing agent that is a core, and a dispersion solvent is polar or non-polar; (b) preparing a second colloidal solution in which a dispersion phase is a prepolymer or oligomer that is a shell, and a dispersion solvent is polar or non-polar; (c) mixing the first colloidal solution and the second colloidal solution prepared in steps (a) and (b) with a precipitant and/or a coagulant; (d) forming a fire extinguishing micro-capsule by precipitating and curing the second colloidal solution at an interface of the first colloidal solution mixed in step (c) to form a core-shell; and (e) rinsing and filtering the fire extinguishing micro-capsule formed in step (d).

The fire extinguishing agent used in step (a) of the present invention may use the formula $C_xH_yO_zHal_k$ (where x, y, z, and k are 0, 1, 2, . . . , and Hal is Br, I, and F). For example, 3M's Novec 1230 may be used as the fire extinguishing agent.

In addition, the shell used in step (b) of the present invention may be made of one or more resins selected from the group consisting of cross-linked polyvinyl acetate, ethyl vinyl acetate, polyvinyl alcohol, polyurea, polyurethane, polyester resin, epoxy resin, urea formaldehyde resin, melamine formaldehyde resin, phenol formaldehyde resin, and resorcinol formaldehyde resin.

Alternatively, the shell may be made of copolymers of at least two selected from cross-linked polyvinyl acetate, ethyl vinyl acetate, and polyvinyl alcohol, or copolymers of at least two selected from polyurea, polyurethane, polyester resin, epoxy resin, urea formaldehyde resin, melamine formaldehyde resin, phenol formaldehyde resin, and resorcinol formaldehyde resin.

In addition, an oligomer polymer or a commercial emulsion may be further included in this step.

In addition, in step (a), a nonionic material or an ionic surfactant may be further included as a stabilizer or an emulsifier, or a polymer material may be further included as a stabilizer.

In addition, the stabilizer may be formed as a portion of the shell during the manufacturing process.

In step (a), one or more materials selected from the group consisting of water, ketones, alcohols or aliphatic hydrocarbons may be further included as the dispersion phase.

In addition, the size of the fire extinguishing micro-capsule may be selectively formed according to a disperser, a propeller, or a turbine mixer used for preparing the first colloid in step (a).

The precipitant used in step (c) of the present invention may include one or more precipitants selected from the group consisting of potassium acetate, sodium citrate, sodium chloride, ammonium chloride, sodium iodide, potassium iodide, copper sulfate, and sodium thiocyanate.

In addition, the coagulant used in step (c) may include one or more coagulants selected from the group consisting of aluminum sulfate, zinc hydroxide, iron hydroxide, and iron chloride.

Step (d) of the present invention may further include a shell curing accelerator or curing catalyst.

In addition, in step (d), when the second colloidal solution is precipitated and cured at the interface of the first colloidal solution, ultraviolet rays, microwave, infrared rays, or induction heating may be applied to help curing into a shell when the second colloidal solution is precipitated and cured at the interface of the first colloidal solution.

The present invention provides a fire extinguisher in which a fire extinguishing micro-capsule is dispersed in a polymer matrix.

Since the fire extinguishing micro-capsule dispersed in the fire extinguisher of the present invention is the fire extinguishing microcapsule described above, a description thereof is omitted.

The polymer matrix of the present invention may use one or more resins selected from the group consisting of phenol formaldehyde resin, polyester resin, epoxy resin, urea resin, resorcinol formaldehyde resin, polyurethane, polyurea, polyacrylate, or polymethyl methacrylate.

In addition, the fire extinguisher may include 0.1-90 wt % of the fire extinguishing micro-capsule. When the fire extinguisher includes 0.1 wt % or less of the fire extinguishing micro-capsule, it is difficult to extinguish the fire because a small amount of the fire extinguishing agent is released in the event of fire. When the fire extinguisher includes 90 wt % or more of the fire extinguishing micro-capsule, it is difficult to form the fire extinguisher.

In addition, the fire extinguisher may further include a decapsulation agent, a decapsulation catalyst, a decapsulation temperature control agent, a diffusion accelerator, a gas permeability enhancer, and a heat conductivity enhancing component.

In addition, the fire extinguisher may be formed in a flexible or solid form depending on the physical properties of the polymer matrix. In the case of the solid, the fire extinguisher may be rigid.

In addition, a case including a gas-permeable membrane may be formed on one surface of the fire extinguisher. The case may be made of one selected from the group consisting of glass fiber, carbon fiber, stainless steel, aluminum-enhanced phenol-formaldehyde, and epoxy. The gas-permeable membrane having a cell size of 10-400 μm may be used.

The fire extinguisher manufactured as described above maintains the shell without releasing the fire extinguishing agent until the ambient temperature is about 140° C. The decapsulation process proceeds at a temperature higher than 140° C. Therefore, the fire extinguisher can be installed in high-temperature devices such as ESSs, lithium-ion battery modules, and fabs, where a rapid rise in heat is expected.

A specific operating temperature may be controlled by adjusting a shell thickness and/or a binder (binder material) of the fire extinguishing micro-capsule.

In addition, the fire extinguisher of the present invention may be manufactured in various forms, such as films, sheets, pads, wires, paints, and faces, by combining and applying various binders (binder materials).

In addition, by removing air from the binder using a low-viscosity binder and vacuum during the process of manufacturing the fire extinguisher, heat may be equally transferred to the fire extinguishing micro-capsule in the fire extinguisher without lowering heat conductivity due to voids caused by air in the binder.

In addition, when the content of the fire extinguishing micro-capsule is less than 60 wt %, the fire extinguisher may be manufactured using a softened suspension. The suspension may be prepared with a fire extinguishing micro-capsule and, when necessary, an additive and a polymer matrix pre-cured by about 20-30%.

In this case, the suspension is pre-softened by microwave or induction heating according to the resistivity of the mixture at 60° C. and is exposed for 60 minutes in order to obtain a fluid state.

On the other hand, when the content of the fire extinguishing micro-capsule of the fire extinguisher is 60 wt % or more, it is may be manufactured by pressurizing a paste. The paste may be prepared with a fire extinguishing micro-capsule and, when necessary, an additive and a polymer matrix pre-cured by about 40-60%.

In this case, the suspension is pre-softened by microwave or induction heating according to the resistivity of the mixture at 60° C. and is exposed for 60 minutes in order to obtain an elastic state.

Hereinafter, the present invention will be described in more detail with reference to
Examples and Experimental Examples.

Examples and Experimental Examples presented herein are only specific examples of the present invention, and are not intended to limit the scope of the present invention.

EXAMPLE 1

Manufacture of Fire Extinguishing Micro-Capsule

A fire extinguishing agent, which was a core, was 1,1,2, 2-tetrafluorodibromoethane, and a shell was epoxy resin. A polymer matrix used in a fire extinguisher was phenol-formaldehyde resin.

50 g of 1,1,2,2-tetrafluorodibromoethane was added to 150 g of water, and polyethylene glycol (average molecular weight: 6,000) was used as a stabilizer. A first colloidal solution was prepared while stirring at 150 rpm for 15 minutes. The first colloidal solution was incubated for 50 minutes at a temperature of 25° C. while constantly stirring. An aqueous solution of epoxy resin was used as a starting component of the shell, and a curing temperature of the resin according to TDS was 50° C. A second colloidal solution was prepared by adding an aqueous resin solution to a colloidal solution of 1,1,2,2-tetrafluorovibroethane incubated with 10 parts by weight of anhydrous epoxy resin based on 100 parts by weight of 1,1,2,2-tetrafluorovibroethane. Immediately after the epoxy resin solution was added, a precipitant (3 wt % ammonium chloride of anhydrous epoxy resin) was introduced into the solution. A temperature profile was as follows: input of ammonium chloride, heating to 40° C. at a rate of 1 K/min, holding at 40° C. for 35 minutes, cooling at 35° C. at a rate of 10 K/min, and continuing temperature control for 24 hours. After 24 hours, the mixture was heated to 50° C. and maintained for 1.5 hours. The generated mixture was drained, washed and dried in a suction filter immediately after the formation of the suspension of the fire extinguishing micro-capsule was completed. A fire extinguishing micro-capsule having a shell thickness of 2.5 μm, a porosity of 2%, a decapsulation temperature of 170° C., and a yield of 95% and having 1,1,2,2-tetrafluorodibromoethane as a fire extinguishing agent was manufactured through the above-described method.

Manufacture of Fire Extinguisher 100 g of phenol-formaldehyde resin was completely mixed using a mixer. After that, a fire extinguishing micro-capsule including a shell prepared by 10 g of urotropin and 50 g of epoxy resin and 1,1,2,2-tetrafluorodibromoethane as a fire extinguishing agent was added to a mixer and mixed under constant stirring. The generated composition was completely mixed until a homogeneous mass was formed. A kneader tank was vacuumized until reaching a pressure of 0.01 MPa, and was maintained in a vacuum state for 20 minutes after the completion of the mixing.

The resulting mass was taken out from a dough bowl, dispersed in a casting mold, heated to 120° C., and removed from the mold to manufacture a fire extinguisher including the fire extinguishing micro-capsule. This fire extinguisher was finally prepared by further performing heat treatment at a temperature of 70° C. for 36 hours for additional curing.

EXAMPLE 2

A fire extinguishing agent, which was a core, was perfluor-2-methyl-3-pentanone, and a shell was cross-linked polyvinyl alcohol. Polypropylene was used as a polymer matrix used in a fire extinguisher.

50 g of perfluoro-2-methyl-3-pentanone was added to 150 g of water, and polyvinyl alcohol sulfate was used as a stabilizer. A first colloidal solution was prepared while stirring at 110 rpm for 20 minutes. The first colloidal solution was incubated for 50 minutes at a temperature of 25° C. while constantly stirring. Epichlorohydrin was added in an amount of 10 parts by weight based on 100 parts by weight of polyvinyl alcohol as a cross-linking agent for cross-linking polyvinyl alcohol. A second colloidal solution was prepared by adding these two materials to a colloidal solution of 1,1,2,2,-tetrafluorobibromomethane incubated with 1,1,2,2-tetrafluorodibroethane. A precipitant (sodium thiocyanate of 1 wt % anhydrous polyvinyl alcohol) was introduced into the solution immediately after epichlorohydrin was added. A temperature profile was as follows: input of sodium thiocyanate, heating to 45° C. at a rate of 1 K/min, holding at 40° C. for 5 hours, cooling at 30° C. at a rate of 10 K/min, and continuing temperature control for 5 hours. The generated mixture was drained, washed and dried in a suction filter immediately after the formation of the suspension of the fire extinguishing micro-capsule was completed. A fire extinguishing micro-capsule having a shell thickness of 1 μm, a porosity of 1.2%, a decapsulation temperature of 140° C., and a yield of 95% and perfluoro-2-methyl-3-pentanone as a fire extinguishing agent were manufactured through the above-described method.

Manufacture of Fire Extinguisher 100 g of polypropylene was completely mixed using a mixer. After that, a fire extinguishing micro-capsule including a shell prepared by 50 g of polyvinyl alcohol and perfluoro-2-methyl-pentanone as a fire extinguishing agent was added to a mixer and mixed under constant stirring. The generated composition was extruded using a receiver screw extruder, and an operating temperature of the extruder was set to 150° C.

A fire extinguisher including the fire extinguishing micro-capsule was manufactured through the above-described processes, and the dimensions thereof were cut according to the intended use.

EXAMPLE 3

A fire extinguishing agent, which was a core, was 1,1,2, 2-tetrafluorodibromoethane, and a shell was polyurea. Polymethyl methacrylate (PMMA) was used as a polymer matrix used in a fire extinguisher.

50 g of 1,1,2,2-tetrafluorodibromethane was added to 150 g of water, and poly(ethylene-alt-maleic anhydride) was used as a stabilizer. A first colloidal solution was prepared while stirring at 3,000 rpm for 40 minutes. The first colloidal solution was incubated for 90 minutes at a temperature of 25° C. while constantly stiffing. Aqueous solutions of isocyanate and polyamine were used as a starting component of the shell, and a second colloidal solution was prepared by adding these aqueous solutions to a colloidal solution of 1,1,2,2-tetrafluorovibroethane incubated with 15 parts by weight of anhydrous epoxy resin based on 100 parts by weight of 1,1,2,2-tetrafluorovibroethane. Immediately after an aqueous isocyanate and polyamine solution was added, a precipitant (potassium iodide of 8 wt % anhydrous polyurea resin) was introduced into the solution. A temperature profile was as follows: input of potassium iodide, heating to 40° C. at a rate of 1 K/min, holding at 40° C. for 60 minutes, heating to 50° C. at a rate of 1 K/min, holding at 50° C. for 60 minutes, heating to 60° C. at a rate of 1 K/min, and continuing temperature control at 60° C. for 24 hours. The generated mixture was drained, washed and dried in a suction filter immediately after the formation of the suspension of the fire extinguishing micro-capsule was completed. A fire extinguishing micro-capsule having a shell thickness of 5 μm, a porosity of 2%, a decapsulation temperature of 110° C., and a yield of 95% and having 1,1,2,2-tetrafluorodibromoethane as a fire extinguishing agent was manufactured through the above-described method.

Manufacture of Fire Extinguisher 300 g of acrylic emulsion polymer (30%) was completely mixed using a mixer. After that, a fire extinguishing micro-capsule including a shell prepared by 50 g of polyurea resin and 1,1,2,2-tetrafluorodibromoethane as a fire extinguishing agent was added to a mixer and mixed under constant stirring. The generated composition was completely mixed until a homogeneous mass was formed. A kneader tank was vacuumized until reaching a pressure of 0.01 MPa, and was maintained in a vacuum state for 30 minutes after the completion of the mixing.

The resulting mass was taken out from a dough bowl, dispersed in a casting mold, heated to 60° C., and removed from the mold to manufacture a fire extinguisher having elasticity and including the fire extinguishing micro-capsule. This fire extinguisher was finally prepared by further performing heat treatment at a temperature of 70° C. for 36 hours for additional curing.

The invention claimed is:

1. A fire extinguishing micro-capsule having a core-shell structure consists of a core, a shell, a precipitant and/or a coagulant, in which the core is a fire extinguishing agent and the shell is a non-porous polymer,
   wherein the precipitant is one or more selected from the group consisting of sodium citrate, sodium chloride, ammonium chloride, sodium iodide, potassium iodide, copper sulfate, and sodium thiocyanate,
   the fire extinguishing agent is 1,1,2,2-tetrafluorodibromoethane and/or perfluor-2-methyl-3-pentanone, and
   the shell consists of one or more resins selected from the group consisting of cross-linked polyvinyl acetate, ethyl vinyl acetate, polyvinyl alcohol, polyester resin, epoxy resin, urea formaldehyde resin, melamine formaldehyde resin, phenol formaldehyde resin, and resorcinol formaldehyde resin.

12

2. The fire extinguishing micro-capsule of claim 1, wherein the coagulant is one or more selected from the group consisting of zinc hydroxide, iron hydroxide, and iron chloride.

3. The fire extinguishing micro-capsule of claim 1, wherein the coagulant is one or more selected from the group consisting of aluminum sulfate, zinc hydroxide, iron hydroxide, and iron chloride.

4. The fire extinguishing micro-capsule of claim 1, wherein a decapsulation process in which a temperature range in which the weight of the fire extinguishing micro-capsule is reduced from 95% to 15% is within 40° C., and a decapsulation rate exceeds 150%/min.

5. The fire extinguishing micro-capsule of claim 1, wherein a thickness of the shell is in a range of 200 nm to 5 μm.

6. The fire extinguishing micro-capsule of claim 1, wherein, when the fire extinguishing micro-capsule is left at 30° C. for 30 days, a weight loss is 0.5% or less of an initial weight.

7. The fire extinguishing micro-capsule of claim 1, wherein, when the fire extinguishing micro-capsule is left at 60° C. for 30 days, a weight loss is 1% or less of an initial weight.

8. The fire extinguishing micro-capsule of claim 1, wherein the shell maintain physico-mechanical properties when exposed to water, alcohol, ketone, ether, and mixtures thereof, and a weight loss after drying is 0.5% or less of an initial weight.

9. A method for manufacturing the fire extinguishing micro-capsule of claim 1, the method comprising:
   (a) preparing a first colloidal solution in which a dispersion phase is a fire extinguishing agent that is a core, and a dispersion solvent is polar or non-polar;
   (b) preparing a second colloidal solution in which a dispersion phase is a prepolymer or oligomer that is a shell, and a dispersion solvent is polar or non-polar;
   (c) mixing the first colloidal solution and the second colloidal solution prepared in steps (a) and (b) with a precipitant, or a precipitant and a coagulant;
   (d) forming a fire extinguishing micro-capsule by precipitating and curing the second colloidal solution at an interface of the first colloidal solution mixed in step (c) to form a core-shell; and
   (e) washing and filtering the fire extinguishing micro-capsule formed in step (d), wherein the precipitant in step (c) is one or more selected from the group consisting of sodium iodide, potassium iodide, copper sulfate, and sodium thiocyanate.

10. The method of claim 9, wherein the fire extinguishing agent in step (a) is 1,1,2,2-tetrafluorodibromoethane and/or perfluor-2-methyl-3-pentanone.

11. The method of claim 9, wherein the shell in step (b) is one or more resins selected from the group consisting of cross-linked polyvinyl acetate, ethyl vinyl acetate, polyvinyl alcohol, polyester resin, epoxy resin, urea formaldehyde resin, melamine formaldehyde resin, phenol formaldehyde resin, and resorcinol formaldehyde resin.

12. The method of claim 9, wherein, in step (a), a nonionic material or an ionic surfactant is further included as a stabilizer or an emulsifier.

13. The method of claim 9, wherein, in step (a), a polymer material is further included as a stabilizer.

14. The method of claim 9, wherein, in step (a), one or more selected from the group consisting of water, ketones, alcohols or aliphatic hydrocarbons are further included as the dispersion phase.

15. The method of claim 9, wherein the coagulant in step (c) is one or more selected from the group consisting of aluminum sulfate, zinc hydroxide, iron hydroxide, and iron chloride.

16. The method of claim 9, wherein, in step (d), a shell curing accelerator or curing catalyst is further included.

17. The method of claim 9, wherein, in step (d), when the second colloidal solution is precipitated and cured at the interface of the first colloidal solution, ultraviolet rays, microwave, infrared rays, or induction heating is applied to cure the shell.

18. A fire extinguisher in which the fire extinguishing micro-capsule of claim 1 is dispersed in a polymer matrix.

19. The fire extinguisher of claim 18, wherein the polymer matrix is one or more resins selected from the group consisting of phenol formaldehyde resin, polyester resin, epoxy resin, urea resin, resorcinol formaldehyde resin, poly-urethane, polyurea, polyacrylate, or polymethyl methacry-late.

20. The fire extinguisher of claim 18, wherein the fire extinguisher includes 0.1-90 wt % of the fire extinguishing micro-capsule.

21. The fire extinguisher of claim 18, wherein the fire extinguisher further comprises a decapsulation agent, a decapsulation catalyst, a decapsulation temperature control agent, a diffusion accelerator, a gas permeability enhancer, and a heat conductivity enhancing component.

22. The fire extinguisher of claim 18, wherein the fire extinguisher is in a flexible or solid form.

23. The fire extinguisher of claim 18, wherein a case including a gas-permeable membrane is formed on one surface of the fire extinguisher.

24. The fire extinguisher of claim 23, wherein the case is made of one selected from the group consisting of glass fiber, carbon fiber, stainless steel, aluminum- enhanced phenol-formaldehyde, and epoxy.

25. The fire extinguisher of claim 23, wherein the gas-permeable membrane has a cell size of 10-400 µm.

* * * * *